No. 752,108. Patented February 16, 1904.

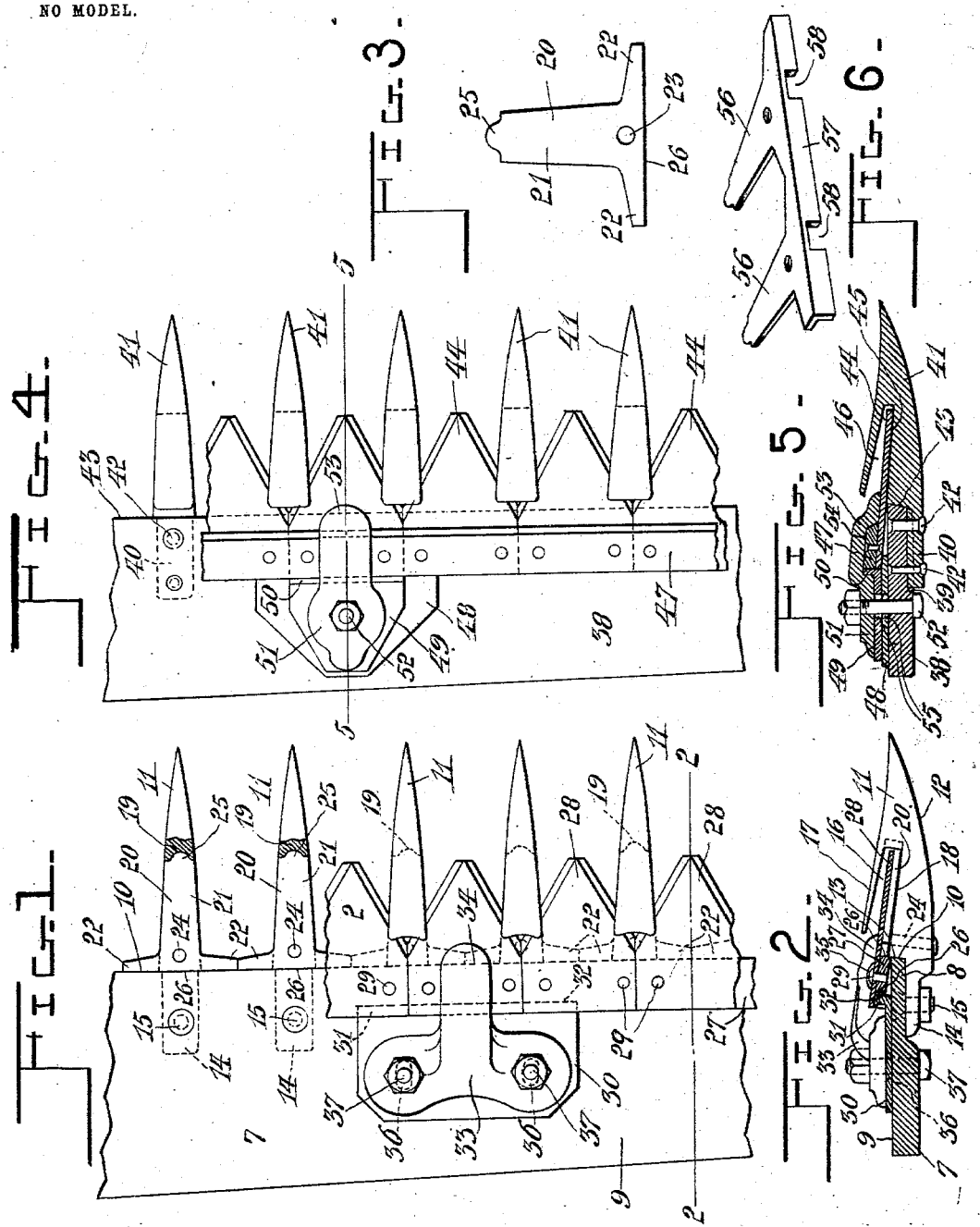

UNITED STATES PATENT OFFICE.

ALFRED CALIXTE RIOUX, OF TORONTO, CANADA.

MOWER-BAR.

SPECIFICATION forming part of Letters Patent No. 752,108, dated February 16, 1904.

Application filed December 16, 1902. Serial No. 135,445. (No model.)

*To all whom it may concern:*

Be it known that I, ALFRED CALIXTE RIOUX, a subject of the King of Great Britain, residing at Toronto, county of York, Province of Ontario, Canada, have invented certain new and useful Improvements in Mower-Bars; and I do hereby declare that the following is a full, clear, and exact description of the invention, such as will enable others skilled in the art to which it appertains to make and use the same.

My invention relates to mowing-machines or harvesters; and its object is to provide an improved form of construction for the finger-bars for implements of this kind.

There is frequently in practice a considerable loss of power in operating the cutter-bars of these machines from the fact that their construction usually enables wisps of grass, &c., to be caught in the knife-runway, which operate to clog the same. This clogging is due partly to the presence of grass in the runway, but is due principally to the fact that such a gathering of grass raises the knife from the ledger-plates and prevents its shearing properly, so that grass then gets caught between the knife and the ledger-plates.

One of the objects of this invention is to overcome this difficulty and, further, to provide a more compact construction than that which usually obtains in practice, enabling the use of shorter guards with their attendant advantages.

The invention consists in the construction and combination of parts, to be more fully described hereinafter, and definitely set forth in the claims.

In the drawings, Figure 1 represents substantially in plan a portion of a finger-bar constructed according to the preferred form of my invention, certain parts, however, being broken away to promote clearness, as will appear. Fig. 2 is a vertical cross-section taken substantially on the line 2 2 of Fig. 1. Fig. 3 is a plan view, upon an enlarged scale, of a ledger-plate used in connection with the finger-bar shown in Fig. 1. Fig. 4 represents in plan a modified form of my finger-bar, the view being substantially like Fig. 1. Fig. 5 is a section through the same, taken substantially on the line 5 5 of Fig. 4. Fig. 6 is a perspective view of a modified form of ledger-plate.

Throughout the drawings and specification the same numerals of reference indicate like parts.

Referring to the parts more particularly, 7 represents the body of the finger-bar shown in Fig. 1. It should appear that it consists, substantially, of a long steel plate tapering slightly toward its outer extremity in the usual manner. It should appear also that the forward portion of this bar is reduced in thickness, as indicated at 8, the upper face 9 of the plate, however, being maintained in the same plane from edge to edge of the bar, as indicated. The forward edge 10 of this bar is provided with pointed guards or fingers 11, which are preferably curved upwardly upon their bottoms 12. They are provided at the rear with shoulders 13, adapted to abut against the aforesaid edge 10 of the mower-bar and having rearward extensions or shanks 14, through which pass countersunk bolts 15, securing the same to the mower-bar, as will be readily understood. These guards are provided with the usual undercut recess 16, lying beneath an integral rearwardly-projecting wing 17. There may of course be as many of the guards as desired. It should be observed that when the mower-bar is disposed in its normal position, or substantially as shown in Fig. 2, the faces 18 of the recesses 16 incline downwardly somewhat toward the point of the guards, and at the forward extremities of the recesses the same are provided with small cavities or recesses 19. Upon the faces 18 are arranged a plurality of ledger-plates 20, one of which is most clearly shown in Fig. 3. They each comprise a tongue or shank 21, with lateral extensions 22 at the rear, and each is also provided with an opening 23, adapted to receive a rivet or bolt 24 for securing the same in place, these bolts passing through the central axis of the guards, so that the tongues 21 constitute the bottoms of the recesses 16 and conform substantially in outline to the shape of the guards at this point. The tongues are provided with tips 25, suitably formed and adapted to be received by the recesses 19. It should be stated that the lateral extensions 22 are of such a length as to enable their extremities to abut, as indicated, and it may be added that these extensions are preferably tapered, as shown. It should be evident that when these ledger-plates are put in place in the manner described a very rigid construction is produced for the reason that they operate to brace each other, and this desirable rigidity is also enhanced by the presence of the interlocking recess 19 and tip 25.

Against the rear edges 26 of the ledger-plates the cutter-back 27 rests. This member, as indicated in Fig. 2, consists, substantially, of a flat bar, preferably formed of steel. The knives or cutters 28, which are preferably of the form shown, are attached to the same upon its upper side by suitable rivets or bolts 29, and at the rear the cutters preferably overlap the knife-back, substantially as shown in Fig. 2. In this manner these parts constitute a knife. Rider-plates 30 are provided of sufficient number to insure efficient operation of the knife. As indicated in Figs. 1 and 2, these rider-plates consist, substantially, of flat rectangular plates provided at their forward edge with upwardly-projecting flanges 31, whereby faces 32 are formed, and these faces abut the rear edge of the cutter-back in the manner shown, the upper edge of the said flange lying beneath the aforesaid overlapping portion of the knives or cutters 28. Above each rider-plate there is provided a clip 33, having a forward extension 34, which lies over the rear portion of the knife in the manner shown, and these clips maintain the knife in position, as will be readily understood. The lower side of the extension 34 is provided with a transverse recess or groove 35 to enable the heads of the rivets 29 to pass during the reciprocation of the knife. It should be understood that these clips also maintain the rider-plates in position, the rider-plates being provided with openings 36, through which pass the bolts 37, and it should be said that these openings are elongated, as indicated in Fig. 2, for the purpose of effecting the adjustment of the rider-plates. It should appear from the arrangement described that no crevices or recesses are formed in or around the knife or the knife-run which might operate to collect grass or weeds and impede the reciprocating movement of the knife, and this I regard as a very valuable feature of this invention.

In Figs. 4 and 5 a construction is shown which is compact and also free from the undesirable recesses referred to. The finger-bar 38 in this instance is provided upon its lower side and forwardly with recesses or grooves 39, which receive the shanks 40 of the steel guards 41, rivets 42 operating to maintain the guards in position. As before, the guards are provided with shoulders 43, which abut the forward edge of the finger-bar, as shown. With this form of my invention I do not employ ledger-plates, the cutters 44 resting directly upon the bottoms 45 of the recesses 46. Moreover, the cutters are attached upon the lower side of the cutter-back 47, as indicated, the rear edges of the cutter-back and the cutters being in alinement. Wearing-plates 48 are provided, the forward edges of which lie beneath the rear edges of the cutters 44 in the manner shown in Fig. 5, and above these wearing-plates rider-plates 49 are placed, which rider-plates, as before, are provided at their forward edges with upwardly-projecting flanges 50, which are adapted to abut against the rear edges of the cutter-back 47 and the cutters. Clips 51 are arranged above these plates, held in place by suitable bolts 52, and comprising forward extensions 53, having recesses 54 upon their lower faces to receive the cutter-back 47 and the flanges 50, and these clips of course operate as before to maintain the knife in proper relation. For the purpose of adjustment the wearing-plates and the rider-plates are provided with elongated openings 55, similar to those provided in the rider-plate described in connection with Figs. 1 and 2.

Instead of making the ledger-plate as shown in Fig. 3, which, however, is its preferred form, I may form several of them in one piece, as indicated in Fig. 6, where two are shown integral with each other. Each ledger-plate then comprises two tongues 56, and for the purpose of additional rigidity and durability the rear edge of this double plate is provided with a downwardly-projecting flange 57, which flange is provided with openings or notches 58 to receive the shanks 14 of the guards. It should appear that this modified form of plate consists simply of two plates of the same form as before, but made in one piece and having the additional flange 57.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim as new is—

1. In a mowing-machine, the combination of a finger-bar, having its forward portion reduced in thickness upon its under face and its upper face in the same plane from edge to edge, rider-plates on said upper face having upwardly-extending flanges at their forward ends, a cutter-bar inclined with relation to the upper face of the finger-bar and bearing against said flanges and knives secured to the cutter-bar and also engaging the said flanges.

2. In a mowing-machine, the combination of a finger-bar, having its forward portion reduced in thickness upon its under face and its upper face of a continuous plane from edge to edge, rider-plates on said upper face and having upwardly-extending flanges at their forward ends, a cutter-bar inclined with relation to said upper face and bearing against said flanges and knives secured to the cutter-bar and also engaging said flanges, said cutter-bar being at all times out of contact with the guard-shanks.

3. In a mowing-machine, the combination of a finger-bar having its forward portion reduced in thickness upon its under face and its upper face in a continuous plane from edge to edge, rider-plates on said upper face and having upwardly-projecting flanges at their forward ends, a cutter-bar inclined with relation to said upper face and bearing against said flanges, knives of uniform thickness throughout secured to the cutter-bar and also engaging said flanges, said cutter-bar being at all times out of contact with the shanks of the guard-fingers.

4. In a mowing-machine, the combination with a finger-bar having its under face reduced in thickness at its forward end, rider-plates having upwardly-projecting flanges, a cutter-bar inclined with relation to the upper face of said first-mentioned bar, and bearing against said flanges, guards secured to the reduced portion of said bar, clips extended over the rider-plates and having forward extensions lying over the rear of the knives, said extensions having recesses on their lower faces, and knives secured to the cutter-bar of uniform thickness and at all times out of contact with the guard-finger shanks.

In witness whereof I have hereunto set my hand in the presence of two witnesses.

ALFRED CALIXTE RIOUX.

Witnesses:
W. L. CAMPBELL,
R. H. JOHNSTON.